US010375101B2

(12) United States Patent
Berger et al.

(10) Patent No.: US 10,375,101 B2
(45) Date of Patent: Aug. 6, 2019

(54) COMPUTER IMPLEMENTED TECHNIQUES FOR DETECTING, INVESTIGATING AND REMEDIATING SECURITY VIOLATIONS TO IT INFRASTRUCTURE

(71) Applicant: International Business Machines Corporation, Armonk, NY (US)

(72) Inventors: Stefan Berger, Larchmont, NY (US); Yangyi Chen, Bloomington, IN (US); Xin Hu, White Plains, NY (US); Dimitrious Pendarakis, Westport, CT (US); Josyula Rao, Briarcliff Manor, NY (US); Reiner Sailer, Scarsdale, NY (US); Douglas Lee Schales, Ardsley, NY (US); Marc Stoecklin, Bern (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/062,374

(22) Filed: Mar. 7, 2016

(65) Prior Publication Data

US 2016/0261624 A1  Sep. 8, 2016

Related U.S. Application Data

(62) Division of application No. 14/501,976, filed on Sep. 30, 2014, now Pat. No. 9,832,217.
(Continued)

(51) Int. Cl.
*H04L 29/06* (2006.01)
*G06F 21/51* (2013.01)
(Continued)

(52) U.S. Cl.
CPC .......... *H04L 63/1433* (2013.01); *G06F 21/51* (2013.01); *G06F 21/52* (2013.01);
(Continued)

(58) Field of Classification Search
None
See application file for complete search history.

(56) References Cited

U.S. PATENT DOCUMENTS

| 6,775,780 B1 * | 8/2004 | Muttik | G06F 21/53 713/165 |
| 7,996,836 B1 * | 8/2011 | McCorkendale | G06F 21/53 713/164 |

(Continued)

*Primary Examiner* — Andrew J Steinle
(74) *Attorney, Agent, or Firm* — Harrington & Smith

(57) ABSTRACT

A method includes collecting system calls and call parameters invoked by monitored applications for target computer systems. The system calls and call parameters are received from operating system kernels on the plurality of target computer systems. Sequences of systems calls and call parameters of the monitored applications are correlated among different target computer systems to deduce malicious activities. Remedial action(s) are performed in response to malicious activities being deduced as being malicious by the correlating. Another method includes determining that network activity at a specific time is deemed to be suspicious. Using IP addresses involved in the suspicious network activity, computer system(s) are determined that are sources of the suspicious network activity. Based on the specific time and the determined computer system(s), application(s) are determined that are executing on the determined computer system(s) that are causing the suspicious network activity. Remedial action(s) are performed for the determined computer system(s).

20 Claims, 11 Drawing Sheets

Related U.S. Application Data

(60) Provisional application No. 61/952,202, filed on Mar. 13, 2014.

(51) Int. Cl.
    *G06F 21/56*     (2013.01)
    *G06F 21/52*     (2013.01)
    *G06F 21/55*     (2013.01)

(52) U.S. Cl.
    CPC .......... *G06F 21/554* (2013.01); *G06F 21/566* (2013.01); *H04L 63/0236* (2013.01); *H04L 63/0263* (2013.01); *H04L 63/06* (2013.01); *H04L 63/1416* (2013.01); *H04L 63/1441* (2013.01); *H04L 63/14* (2013.01)

(56) References Cited

U.S. PATENT DOCUMENTS

| | | |
|---|---|---|
| 2004/0025015 A1 | 2/2004 | Satterlee |
| 2004/0047356 A1* | 3/2004 | Bauer ............... H04L 63/145 370/401 |
| 2006/0026680 A1* | 2/2006 | Zakas ................. H04L 29/06 726/22 |
| 2009/0158430 A1* | 6/2009 | Borders ............ G06F 21/552 726/23 |
| 2009/0327688 A1 | 12/2009 | Li |
| 2011/0225190 A1 | 9/2011 | Kelly |
| 2012/0017275 A1 | 1/2012 | Harmonen |
| 2012/0075314 A1* | 3/2012 | Malakapalli ........... G06T 1/20 345/522 |
| 2012/0144227 A1 | 6/2012 | Perkins et al. |
| 2014/0032915 A1 | 1/2014 | Muzammil |

\* cited by examiner

900

---

Collecting system calls and call parameters invoked by monitored applications for each of a plurality of target computer systems, where the system calls and call parameters are received from operating system kernels on the plurality of target computer systems, where the operating system kernels have been instrumented to report system calls and call parameters invoked by the monitored applications
910

↓

Correlating sequences of systems calls and call parameters of the monitored applications among different target computer systems to deduce malicious activities
920

↓

Performing one or more remedial actions in response to one or more malicious activities being deduced by the correlating
930

```
Determine that network activity at a specific
time is deemed to be suspicious
1010
```
↓
```
Determine, using internet protocol addresses
involved in the suspicious network activity, one
or more computer systems that are sources of
the suspicious network activity
1020
```
↓
```
Determine, based on the specific time and the
determined one or more computer systems, one
or more applications executing on the determined
one or more computer systems that are causing
the suspicious network activity
1030
```
↓
```
Cause one or more remedial actions to be
performed for the determined one or more
computer systems
1040
```

FIG. 10

COMPUTER IMPLEMENTED TECHNIQUES FOR DETECTING, INVESTIGATING AND REMEDIATING SECURITY VIOLATIONS TO IT INFRASTRUCTURE

CROSS-REFERENCE TO RELATED APPLICATIONS

The present application is a divisional application of Ser. No. 14/501,976, filed on Sep. 30, 2014, which claims the benefit under 35 U.S.C. § 119(e) of U.S. Provisional Patent Application No. 61/952,202, filed on Mar. 13, 2014, the disclosures of which are hereby incorporated by reference in their entirety.

FIELD AND BACKGROUND

This invention solves the problem of detecting, investigating and remediating security violations to IT (Information Technology) infrastructure and in particular cloud computing-based IT infrastructure. As an example, a security violation may involve the modification or replacement of a critical software component, such as an executable file by one of unknown provenance or an unexpected modification of a critical configuration file. Alternatively, a process that started from an executable file that is deemed authentic may exhibit suspicious behavior, such as attempting to read/modify files it does not normally require, attempting to connect to known malicious websites and/or DNS servers, or spawning new processes. Such behaviors may indicate that the program has a vulnerability that is being exploited.

The problem with detecting such security violations is that it is very hard to reason about all security risks related to a computer systems as a consequence of a cyber-security threat (attack, infection, etc.), in particular about changes to files, behaviors of processes in a single system, or its behavior on the network, and even more so as one expands the scope to a large set of systems, e.g., a data center or cloud. Existing security mechanisms such as anti-virus (AV) systems and intrusion detection/prevention systems (IDS/IPS) generally suffer from high false negatives and/or false positives that limit their effectiveness due to the lack of precision. In particular, AV systems and signature-based IPS/IDS systems rely on malware and attack signatures and are thus often unable to catch zero-day vulnerabilities, multi-stage attacks and advanced persistent threats (APT) that leverage multiple steps, each one of which may appear, in isolation, to be benign. Behavior analysis-based systems were proposed to address these limitations; however, those systems often end up with relatively high false positive rates due to the limited access to global information required to build accurate models of system and process behavior.

As an alternative to detecting malicious behavior within a single computer system, a number of approaches aim to lock-down systems so as to prevent violations in the first place. These typically implement Mandatory Access Control (MAC) policies, for example by defining which subjects (processes) could access which objects (files, sockets, and the like). Example realizations of MAC policies include LINUX security modules (LSM) like SELINUX, TOMOYO LINUX and APPARMOR and operating systems like TRUSTED SOLARIS and TRUSTED AIX. A similar approach is taken by SYSTRACE (for LINUX) which aims to restrict a process' access to system calls. Note that these terms may be trademarks of the respective owners. All those systems have in common that they confine the behavior of the processes by comparing their behaviors during run time against a predefined or learned profile (policy). Policies can be derived during a learning phase that observes the processes running in a given system. However, those approaches usually suffer from one or more of the following drawbacks.

First, defining these policies has been proven to be time consuming and complex. The learning approach is limited by the amount of time it runs and the spectrum of valid behaviors that a program or process will exhibit during this time. Additionally modern IT systems have become much more agile and dynamic, making it harder for MAC-based systems to adapt. Second, those approaches work on each system independently and thus don't have the global view of the IT infrastructure. Moreover, these systems maintain an in-host view of events only, and these systems do not inspect network traffic activity from a single system as well as a collection of systems.

For instance, if multiple suspicious activities appear in multiple systems, this might be an indication of widespread malicious activity and thus could be used to increase the confidence level determining an out-of-profile behavior, both on the operating system level and the network level. Sharing a learned profile between different servers at different granularity for similar systems is also very inconvenient. Additionally, the approaches described above are not easily applicable to cloud-based IT infrastructure, where information from cloud Operations Support System (OSS) and/or Business Support System (BSS) systems as well as common hypervisors, virtual and physical networks provides additional valuable context and data about security related events.

Furthermore, those approaches lack mechanisms to close the loop between detection of policy violations and refinement of the policies and none of them provides an intuitive way for investigating incidents/violations.

SUMMARY

A method comprises the following: collecting, by a computer system, system calls and call parameters invoked by monitored applications for each of a plurality of target computer systems, where the system calls and call parameters are received from operating system kernels on the plurality of target computer systems, where the operating system kernels have been instrumented to report system calls and call parameters invoked by the monitored applications; correlating, by the computer system, sequences of systems calls and call parameters of the monitored applications among different target computer systems to deduce malicious activities; and performing, by the computer system, one or more remedial actions in response to one or more malicious activities being deduced as being malicious by the correlating.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: collecting system calls and call parameters invoked by monitored applications for each of a plurality of target computer systems, where the system calls and call parameters' are received from operating system kernels on the plurality of target computer systems, where the operating system kernels have been instrumented to report system calls and call parameters invoked by the monitored applications; correlating sequences of systems calls and call parameters of the monitored applications among different target computer systems to deduce malicious activities; and performing one or more remedial actions in response to one or more malicious activities being deduced as being malicious by the correlating.

An exemplary apparatus comprises: means for collecting, by a computer system, system calls and call parameters invoked by monitored applications for each of a plurality of target computer systems, where the system calls and call parameters are received from operating system kernels on the plurality of target computer systems, where the operating system kernels have been instrumented to report system calls and call parameters invoked by the monitored applications; means for correlating, by the computer system, sequences of systems calls and call parameters of the monitored applications among different target computer systems to deduce malicious activities; and means for performing, by the computer system, one or more remedial actions in response to one or more malicious activities being deduced as being malicious by the correlating.

An exemplary computer program product includes a computer-readable storage medium bearing computer program code embodied therein for use with a computer. Execution of the computer program code causes the computer to perform at least the following: collecting, by a computer system, system calls and call parameters invoked by monitored applications for each of a plurality of target computer systems, where the system calls and call parameters are received from operating system kernels on the plurality of target computer systems, where the operating system kernels have been instrumented to report system calls and call parameters invoked by the monitored applications; correlating, by the computer system, sequences of systems calls and call parameters of the monitored applications among different target computer systems to deduce malicious activities; and performing, by the computer system, one or more remedial actions in response to one or more malicious activities being deduced as being malicious by the correlating.

Another exemplary method comprises: determining that network activity at a specific time is deemed to be suspicious; determining, using Internet protocol addresses involved in the suspicious network activity, one or more computer systems that are sources of the suspicious network activity; determining, based on the specific time and the determined one or more computer systems, one or more applications executing on the one or more determined computer systems that are causing the suspicious network activity; and causing one or more remedial actions to be performed for the determined one or more computer systems.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining that network activity at a specific time is deemed to be suspicious; determining, using Internet protocol addresses involved in the suspicious network activity, one or more computer systems that are sources of the suspicious network activity; determining, based on the specific time and the determined one or more computer systems, one or more applications executing on the one or more determined computer systems that are causing the suspicious network activity; and causing one or more remedial actions to be performed for the determined one or more computer systems.

A further exemplary embodiment is an apparatus, comprising: means for determining that network activity at a specific time is deemed to be suspicious; means for determining, using Internet protocol addresses involved in the suspicious network activity, one or more computer systems that are sources of the suspicious network activity; means for determining, based on the specific time and the determined one or more computer systems, one or more applications executing on the one or more determined computer systems that are causing the suspicious network activity; and means for causing one or more remedial actions to be performed for the determined one or more computer systems.

An exemplary computer program product includes a computer-readable storage medium bearing computer program code embodied therein for use with a computer. Execution of the computer program code causes the computer to perform at least the following: determining that network activity at a specific time is deemed to be suspicious; determining, using Internet protocol addresses involved in the suspicious network activity, one or more computer systems that are sources of the suspicious network activity; determining, based on the specific time and the determined one or more computer systems, one or more applications executing on the one or more determined computer systems that are causing the suspicious network activity; and causing one or more remedial actions to be performed for the determined one or more computer systems.

BRIEF DESCRIPTION OF THE SEVERAL VIEWS OF THE DRAWINGS

The invention will now be described with specific reference to the drawings in which:

FIG. 9 is a logic flow diagram for detecting, investigating and remediating security violations to IT infrastructure, and illustrates the operation of an exemplary method, a result of execution of computer program instructions embodied on a computer readable memory, functions performed by logic implemented in hardware, and/or interconnected means for performing functions in accordance with exemplary embodiments; and FIG. 10 is another logic flow diagram for detecting, investigating and remediating security violations to IT infrastructure, and illustrates the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION

Figure 1A:
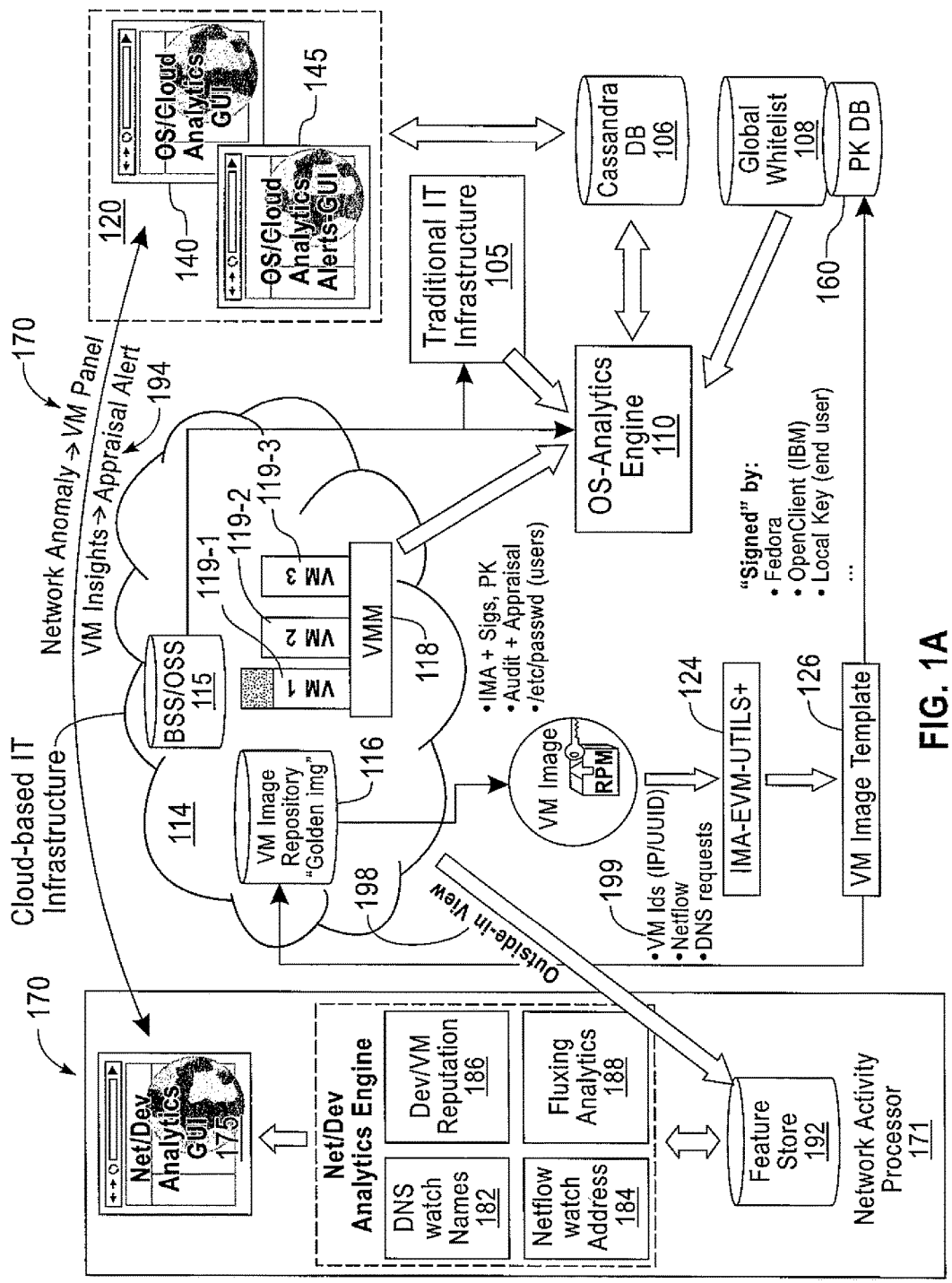
FIGS. 1A and 1B, collectively FIG. 1 herein, illustrates a cloud-based infrastructure in accordance with an exemplary embodiment of the present invention.

Exemplary embodiments of the invention may comprise two levels on which malicious behavior is detected and may combine two separate views (instrumentation) of computer systems.

First, detection may be performed both on a per-system level and a combined population level. On the per-system level, the behavior of every system may be analyzed independently and compared against baseline patterns and models learned in the past. On the population level, behaviors of all active systems may be analyzed in a combined fashion to identify conditions that indicate the presence of malicious or suspicious activity on the multiple systems. Moreover, this level enables predictive threat detection; if, for some system, suspicious activity has been identified that has led to a malicious condition on another system in the past, the newly suspicious system can be treated before the malicious condition arises.

Second, the invention may combine two layers of instrumentation and monitoring of systems to gain insight into their activity. The first layer relates to "in-host monitoring", that is, the systems may be equipped with software agents that are running within the monitored systems and gain thereby detailed visibility into events and activities on the system. The second layer relates to passive monitoring on the network by inspecting network traffic outbound and inbound from a monitored system. While the second layer does not provide as deep of insights into specific processes and events on the system, the second layer is not prone to attackers that may tamper with in-host monitoring agents. The second layer may obtain its information via Netflow protocol from network traffic statistics taken by, e.g., switches. Netflow is a feature supported by certain switches and routers. It provides the ability to collect IP (Internet Protocol) network traffic as the traffic enters or exits an interface of a switch or router. It has the ability to provide statistics about the observed network traffic. By analyzing the data provided by Netflow, a network administrator or automated process can determine information such as the source and destination IP addresses of traffic, class of service, and causes of congestion.

On the in-host monitoring layer, the invention may model the behavior of each system's Trusted Computing Base (TCB) from a known good state and then may closely monitor how the TCB on each system evolves. The system correlates security-related data from multiple sensors across multiple similar systems for detection of security violations with higher accuracy than aforementioned systems can achieve. Compared to known solutions, the ability to aggregate and process large amounts of different data and draw insights from those data helps to increase the detection rate while controlling the false positive rate.

On the network monitoring layer, this invention may inspect different application protocols (e.g., DNS, HTTP) and traffic monitoring granularities (e.g., flow-level, packet-level inspection, etc.) to build models of good behavior and closely inspects subsequent activities as the systems evolve. Similar to the in-host monitoring layer, the multi-protocol and granularity aspect enables certain exemplary embodiments of the invention to detect security relevant behaviors with higher accuracy and even detect new, previously unknown threats.

Systems implementing the functionality of this invention may implement two major phases depending on implementation: a learning phase and an enforcement phase. For the learning phase, the approach assumes that each system is started from a known good state with trusted models. From then on, in an exemplary embodiment, a system implementing this invention tries to capture security-sensitive activities on all observed systems (e.g., processes, system calls, network connections). For example, at the in-host monitoring layer, security-sensitive activities in the context of this invention for an exemplary embodiment mean file creation/deletion/modification, network connection/binding, process creation, kernel module insertion, etc. Certain exemplary embodiments of the invention may then organize these activities and extract useful baseline patterns/models from them to form profiles of different granularity by leveraging potential data from IT infrastructure management system or Cloud OSS/BSS (Operations Support Systems/Business Support Systems) databases. During the enforcement phase, the system detects violations to previously learned baseline patterns/models and correlates those violations to achieve a more accurate estimation of anomalous behavior.

To effectively monitor both the self-evolvement and interaction with other systems of a monitored system, exemplary embodiments may leverage multiple data sources from the IT infrastructure. Specifically, the LINUX Integrity Measurement Architecture (IMA) may be integrated into exemplary embodiments of the invention to access the integrity of security critical files. Different types of security-related messages from auditing subsystem are also extracted.

Besides information directly obtained from within the IT infrastructure, the invention also leverages useful external security-related information to achieve better detection rate. For instance, external IP/Domain blacklists are used to compare against network connections created by the observed systems, external file blacklists are used to assess file creation/modification activities and software vulnerability reports are used to evaluate the programs running on monitored systems.

Provenance information about security-sensitive activities may be kept and organized by exemplary embodiments of the invention for later investigation.

Exemplary embodiments herein aim to correlate information about system files, processes and network activity to build a more accurate estimation of anomalous behavior. Results are preferably obtained and integrated/correlated from, e.g., network and user analytics. IMA is utilized for system integrity monitoring and can be used to detect unauthorized usage of software since IMA may have been configured to enforce that only signed executables can be run. Provenance, build, and software execution profile(s) may be maintained over longer periods of time across different granularities (such as per-system and global) to provide a more comprehensive view of potential sources of attacks/violations.

Exemplary embodiments herein may integrate external sources of information such as white and black list databases and may leverage the cloud to simplify the derivation of patterns and clusters of expected behavior. For example, VMs launched by the same user, running the same programs, started from the same image or family of images, etc., are observed. The foregoing allows the building of profiles and detection of deviations to be amortized over multiple systems.

For background information purposes, the reader shall note that IMA implements and continues a transitive trust chain architecture that is started by early code in a machine's firmware (e.g., BIOS). The firmware is assumed to have been instrumented to take measurements of next-to-be executed code and log those measurements before executing that code. This continues until the BIOS loads an operating system boot loader that is assumed to also measure and log the measurements of the operating system kernel, initial RAM disk, and other files the boot loader loads, before the boot loader executes the operating system's kernel. IMA, as instrumented in the LINUX operating system for instance, will then take measurements of executables, libraries and other files, depending on a user provided policy, and again log those measurements before executing code. A local or remote system security administrator may then be able to look at those measurements and determine whether all components of the system are assumed to be trustworthy based on known measurements written in the log.

Figure 1B:
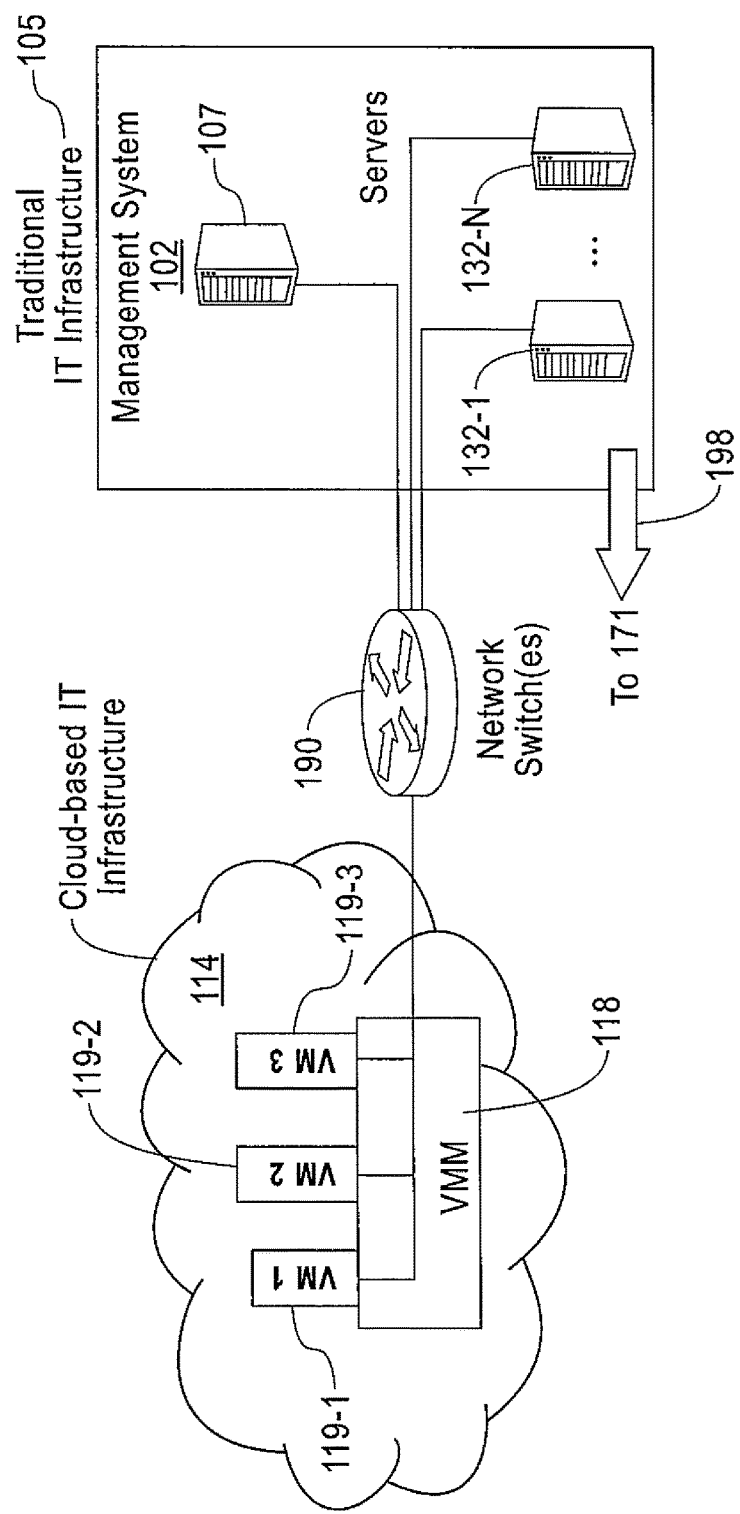

FIGS. 1A and 1B, collectively FIG. 1 herein, provide an overview of an embodiment of the present invention. Multiple computer systems are set up for monitoring system events that help conclude whether software installed on one or multiple of those computer systems have malicious intentions. All computer systems 102, 104 are setup in such a way that their system events are streamed to a centralized analytics engine 110 that processes and interprets these events using its global view (over multiple of those systems and databases 106 and 108) and itself sends notifications about its findings to a dashboard 120 for further investigation, e.g., by a human.

A virtual machine image 122 in the VM image repository 116 can host software installed from RPM software packages (RPM is a file format that can be used by a RPM package manager in LINUX systems) that contain (e.g., previously mentioned) signed files, such as signed executables, which is indicated in 122 by the key attached to the RPM. To enforce that only signed executables can be started, IMA with appraisal support should be activated in the LINUX kernel located in the virtual machine image once a VM is running. Using IMA related utilities for collecting the public keys used for verifying the signatures on installed software, a VM image template 126 can be created and the software publisher key database 160 populated with those keys.

The traditional IT infrastructure 105 is an example of a computer system 102 and includes a management system 107 that manages multiple servers 132-1 through 132-N. The traditional IT infrastructure 105 and the cloud-based IT infrastructure 114 may be interconnected through, e.g., one or more network switches 190.

The cloud-based IT infrastructure 114 is one example of a computer system 104. The cloud-based IT infrastructure 114 comprises in this example of a Business Support System (BSS) and/or Operations Support System (OSS) 115. BSS systems are used by operations, customer care, and other functional groups to manage business operations focusing on external business such as billing, rating, sales management, customer-service management and customer databases. OSS systems allow operations and IT personnel to administer the operational processes focusing on the network and services, including service quality monitoring, network and server performance, logical and physical resources management (also referred to as element and network management), and provisioning. The cloud-based IT infrastructure 114 also comprises a Virtual Machine Manager (VMM) 118 that manages multiple Virtual Machines (VMs) 119-1 through 119-3, and comprises a VM image repository 116. The VM image repository 116 may include "golden images", of which an exemplary image may serve as a template used to create a VM 119. The cloud-based IT infrastructure 114 can send the following information to the analytics engine 110: Measurements (e.g., hashes) of files taken by the Integrity Measurement Architecture along with signatures of executables that were started and the public keys or identifiers of those public keys used to verify the executables' signatures, along with auditing information from the operating system's auditing subsystem that can include IMA Appraisal information. Furthermore, the streamed data may include information about current accounts on a system that can for example be found on LINUX systems in the file/etc/passwd. Knowledge about available accounts on individual system serves, among other things, the purpose of monitoring the creation of new accounts.

The database 106 in this example is a Cassandra database, although this is merely exemplary. A Cassandra database, in an example, is used to store a large amount of data across a variety of machines. In the case of this embodiment, the Cassandra DB 106 servers as a database for storing and indexing a variety of data from the OS-Analytics Engine 110. The database 108 is in this example a global whitelist, which contains indications of applications that have been deemed to have no security violations and are therefore deemed suitable to run on computer systems such as virtual machines 119 and servers 132. By contrast, a blacklist database would contain information about applications that have been deemed to have security violations and are therefore not suitable for execution on those servers. Furthermore, the global whitelist database 108 has an associated publisher key (PK) database 160, which in this example has indications of which entity (software vendor, local user) signed the files in each of the RPMs. This database 160 may be used to determine that a file that was originally signed by one entity is currently signed by a different entity, and this change in signatures may indicate a security violation.

The dashboard 120 may be a user interface in a display such as a web browser. The display in this example includes an OS (Operating System)/Cloud Analytics GUI (Graphical User Interface) 140 and an OS/Cloud Analytics Alerts GUI. The dashboard 120 may directly or indirectly interact with the Cassandra database 106 from which the dashboard receives display data for the OS/Cloud Analytics GUI 140 and alert notification for the OS/Cloud Analytics Alerts GUI 145.

FIG. 1 also illustrates another computer system 170, which is an example of a network activity processor 171. The network activity processor 171 includes a Net/Dev (network and device) analytics GUI 175, a Net/Dev analytics engine 180, and a feature store 192. Information from the cloud-based IT infrastructure 114 (and also from the traditional IT infrastructure 105 if desired, see FIG. 1B) is represented as outside-in view 198. The Net/Dev analytics engine 180 includes DNS watch names 182, a Dev/VM (Device/Virtual Machine) reputation engine 186, a Netflow watch address engine 184, and fluxing analytics 188. The outside-in view 198 uses input 199 such as VM IDs (identifications, such as IP addresses or universally unique identifiers (UUID)), Netflow information, and DNS (domain name service) requests. As previously described, Netflow is a feature supported by certain switches and routers. It provides the ability to collect IP (Internet Protocol) network traffic as the traffic enters or exits an interface on such a device and provides statistics about the observed traffic. By analyzing the data provided by Netflow, a network administrator or automated process can determine information such as the source and destination of traffic, class of service, and causes of congestion. An analytics engine can use Netflow data to determine which devices may have caused suspicious network behavior. The individual devices can then be identified by their IP address for example. Features of network statistics, such as tuples of source and destination IP addresses, protocol, and destination port, are extracted from the Netflow data and stored in the feature store 192. The feature store 192 is a specialized database that aggregates the above mentioned network traffic features as they were observed over a certain time span.

The Net/Dev Analytics GUI 175, which is created by computer system 170, in an exemplary embodiment, allows an administrator to see network activity as observed on switches. Based on IP addresses involved and time of the communication, one could determine the executable that caused suspicious network traffic following information collected by the OS analytics engine 110. Having observed suspicious network activity involving a source and destination IP address at a specific time, the involved IP address of the network activity may be used to determine the source virtual or physical machine of the network activity. The time of the network activity may be used to determine the application causing the network activity. The capability to execute these steps may involve knowledge about IP addresses of VMs 119 or servers 132 at the given time along with knowledge of the process that was involved in the suspicious network traffic. To be able to provide insights into traffic caused by processes, the OS analytics engine should record enough data to be able to show which executable was used to create a process. Furthermore, remedial action such as quarantining the source virtual or physical machine may be invoked. In one example, the computer system 170 would be responsive to input from an administrator in order to perform the operations above. In this case, the determination of what is suspicious network traffic (e.g., traffic having an amount that is above a threshold as previously determined for the virtual or physical machine, such as using average amounts of traffic over a time period or traffic that contacts a blacklisted IP address) would be performed by the administrator. The GUI 175 may also provide, in response to a request from the administrator, information to allow the administrator to determine the source virtual or physical machine causing the network activity. Additionally, the Net/Dev Analytics engine may be responsive to the administrator to undertake remedial action indicated by the administrator, such as invoking quarantine for the source virtual or physical machine.

In other exemplary embodiments, the Net/Dev Analytics Engine 180 is programmed to cause the computer system 170 to perform one or all of these actions. For example, the engine 180 may be programmed to determine average amounts of traffic over a time period for VMs 119 and servers 132, and also determine thresholds (e.g., double or triple) for amounts of traffic to be deemed suspicious. The Net/Dev Analytics Engine 180 can be programmed to determine a source and destination IP address at a specific time (e.g., when the suspicious network activity is occurring), to determine the involved IP address of the network activity and therefore the source virtual or physical machine of the network activity. The time of occurrence of the network activity may be used by the Net/Dev Analytics Engine 180 to transfer the user's view from the Net/Dev Analytics GUI's Network Anomaly Panel to the VM Panel in the OS/Cloud Analytics GUI 140 using the path described in 196. Following the path 196, the user can then determine the application that caused the network activity by interacting with the OS/Cloud-Analytics GUI 140. Furthermore, the Net/Dev Analytics Engine 180 may be programmed to perform remedial action such as invoking quarantine of the virtual or physical machine causing the suspicious network traffic.

An exemplary embodiment of an inventive method comprises two major phases: a learning phase and an enforcement phase. In the learning phase, a system implementing this embodiment tries to capture security-sensitive activities of each program running on every monitored system inside the IT infrastructure. For example, security-sensitive activities in the context of exemplary embodiments of this invention mean file creation/deletion/modification, network connection/binding, process creation, kernel module insertion and the like. Exemplary embodiments of the invention organize these activities and extract useful patterns/models from them to form profiles on different granularities, for example, on user level, project level or system level. Inputs 240 to the analytics engine 210 therefore include the following data from computer systems being investigated: auditing events; file measurements obtained for example from IMA; and BIOS (Basic Input/Output System) (e.g., firmware) measurements. These inputs 240 can be from many different types of computers, such as those running LINUX for instance. In an example, a computer operating system kernel that has been instrumented to report system calls and their call parameters invoked by applications can be used to provide the input 240 to the analytics engine 210. In the context of computer programming, instrumentation refers to the ability to, e.g., monitor or measure a level of an application's performance, to diagnose errors and/or to write trace information. Typically, programmers implement instrumentation in the form of code instructions that monitor specific components in a system.

Figure 2:
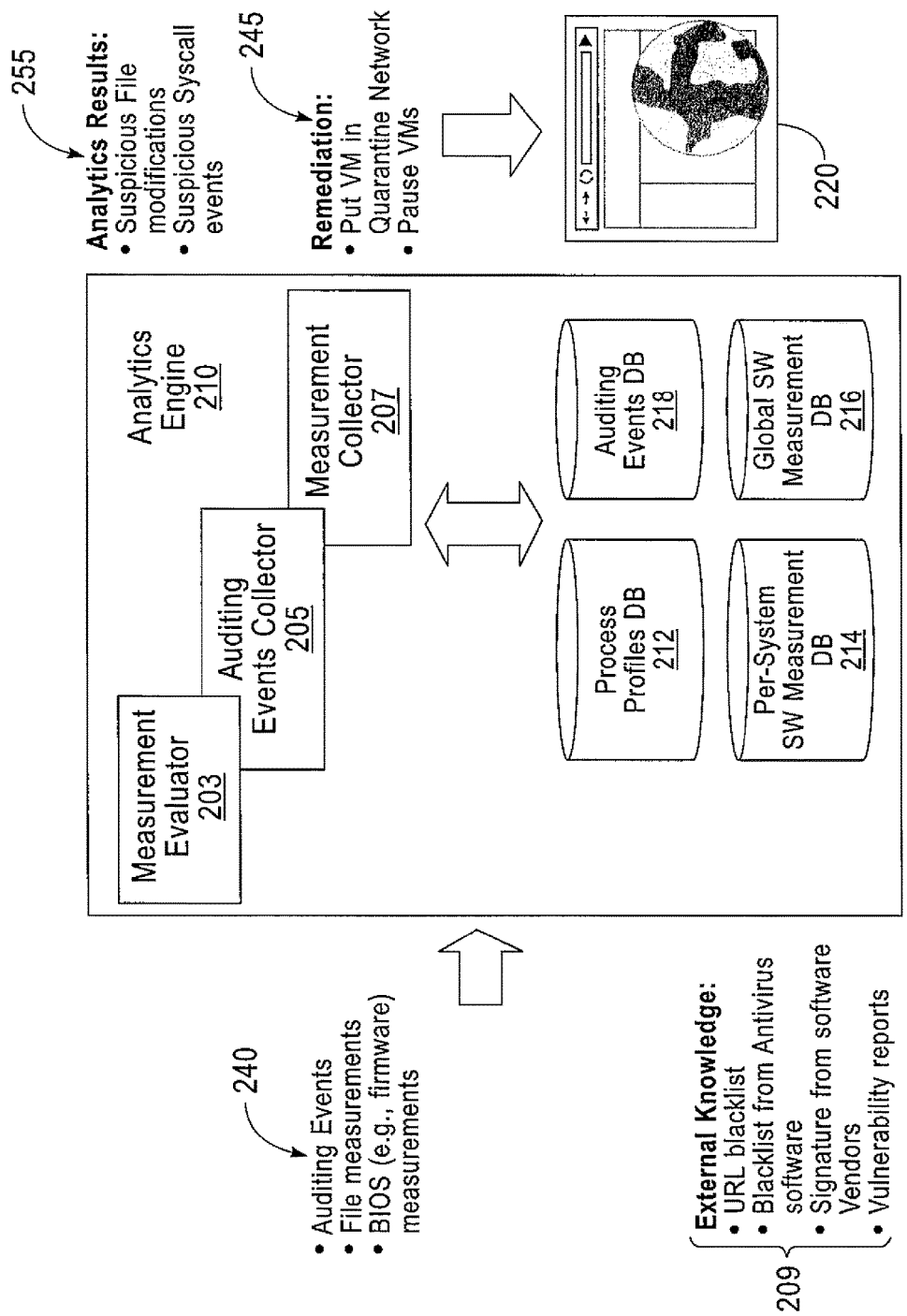
FIG. 2 illustrates the analytics engine in accordance with the present invention.

As illustrated in FIG. 2, the analytics engine 210 (e.g., a version of the analytics engine 110) collects audited events at Auditing Events Collector 205, and obtains BIOS (Basic Input/Output System) and file measurements at Measurement Collector 207. A Measurement Evaluator 203 utilizes thresholds and historical data to determine what measurements are considered significant for collection and analysis. Content from external knowledge sources (shown at 209), such as URL (Uniform Resource Locator) blacklists, blacklists from antivirus software, signatures from software vendors, and vulnerability reports, is accessed by the Analytics Engine 210 for evaluating the significance of measurements and audited events. As indicated previously, blacklists are lists of entities (e.g., applications) that are considered to cause or have computer security violations.

The analytics engine 110 uses one or more databases or database tables, illustratively shown as four databases, to store Process Profiles at 212, Per-System Software (SW) Measurements at 214, Global Software Measurements at 216, and Auditing Events at 218. The process profiles database 212 includes profiles of the behavior of processes (e.g., running applications). These profiles may include system calls (short 'syscalls') and other behavior, on a per-process basis. Note that a started program becomes a process or 'running application'. A 'running application' can spawn multiple processes.

For the global software measurement database 216, there is a repository crawler that looks for software applications installation packages that can be installed on, e.g., a LINUX system, such as for example RPM packages. The crawler downloads RPMs from RPM repositories and calculates the measurements (hashes) for files contained in those RPMs and stores them in the database 216. These measurements are considered 'global'. Meanwhile, the per-system software database 214 includes per-system, not global, measurements for applications that were not found in the global software database 216 at the time they were obtained by the analytics engine 210. One way the databases 214 and 216 might be used is to reduce the number of alerts raised. For instance, if a measurement is encountered by the analytics engine 210 that is neither found in the global software measurement database 216 nor the per-system software measurements database 214, an entry in the per-system software measurement database 214 is made. When in the future that same measurement is encountered again, the measurement can then be found in the per-system software database 214 and therefore the previously already shown alert can be suppressed.

The auditing events database 218 contains data determined from the auditing events collector. This database 218 includes auditing events from inputs 240, which form a basis for the process profiles stored in the process profiles database 212. For instance, the auditing events database 218 could include syscalls performed by a process and the parameters that were used in those syscalls along with timestamps that indicate when each syscall was invoked. A profile of the process is built during the system's learning phase and can include series of these syscalls. Series of syscalls observed during the learning phase can be considered a baseline pattern/model and would not indicate any security violations by a process. Any deviation from this baseline could be interpreted as indication of a security violation.

In the enforcement phase, the invention in an exemplary embodiment detects violations to learned baseline patterns/models and correlates violations to achieve a more accurate estimation of anomalous behavior, which may be output in form of, e.g., Analytics Results 255 and proposed Remediation 245 to the dashboard at 220. The analytics results 255 include in this example suspicious file modifications and suspicious syscall events. These analytics results 255 may be reported as alerts to, e.g., the dashboard 220. The proposed remediation 245 in this example includes putting one or more VMs in a quarantine network and/or pausing one or more VMs. Other remedial actions such as shut down of a VM are also possible. The illustrated proposed remediation 245 is relevant for the cloud-based IT infrastructure 114. Note that FIG. 1 also relates to a traditional IT infrastructure 105. Relative to the traditional IT infrastructure 105, the remediation 245 could include placing a server 132 in quarantine, such as by causing the server to be isolated from the network by configuring a physical switch such as network switch 190, as an example. That is, the physical switch 190 could block network traffic to and from the server 132.

Figure 3:
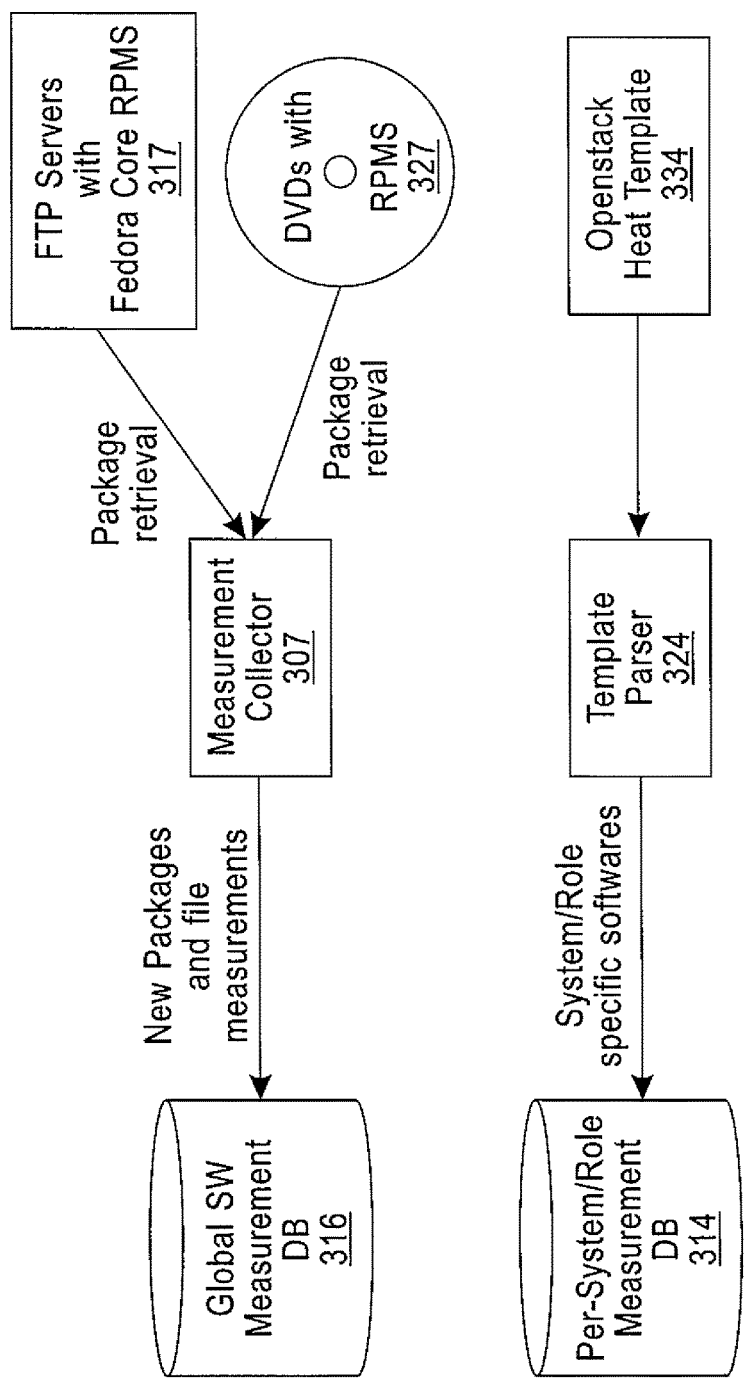
FIG. 3 illustrates an embodiment of data collection in accordance with the present invention.

The Integrity Measurement Architecture (IMA) is integrated into a system implementing exemplary embodiments of this invention and is used to assess the integrity of security critical files as illustrated in FIG. 3. To achieve this, a global file whitelist (108 of FIG. 1) is built by crawling software package repositories, such as FTP (File Transfer Protocol) servers at 317, or directly importing from software installation mediums, shown as DVDs (Digital Versatile or Video Disks) at 327. The FTP servers 317 in this example host software packages of a LINUX Distribution called Fedora. The format of theses software packages is the RPM (Red Hat Package Manager) format. The Measurement Collector 307 (a version of the measurement collector 207) retrieves the RPM packages and calculates measurements (e.g., hashes) of the files the collector finds in those packages. It stores information about the packages, such as version information, the processor platform for which the package contains software, along with the file measurements in the Global Software Measurement Database 316 (a version of the Global SW management database 216).

The template parser 324 is an extension of the system of FIG. 2. A Template Parser 324 can access the Openstack Heat Template 334 to obtain system-specific and role-specific software for storage at the Per-System/Role Measurement Database 314 (a version of the per-system SW measurement database 214). For instance, the Openstack Heat Template 334 may describe a particular VM infrastructure, e.g., 3 VMs, connected to a particular network, with a particular number of virtual hard drives. This could be a single template in a template library for the Openstack Heat Template 334 for this particular VM infrastructure. It may be assumed that any VM 119 with the particular VM infrastructure (e.g., as a template) would operate with similar or same behavior. The template parser 324 can therefore provide this information as system/role specific software to the per system/role measurement database, such that the analytics engine 201 can make a determination for VMs 119 that are instantiations of the same template and therefore are expected to show similar or same behavior. Any deviation from the expected behavior could be a possible security violation.

Figure 4:
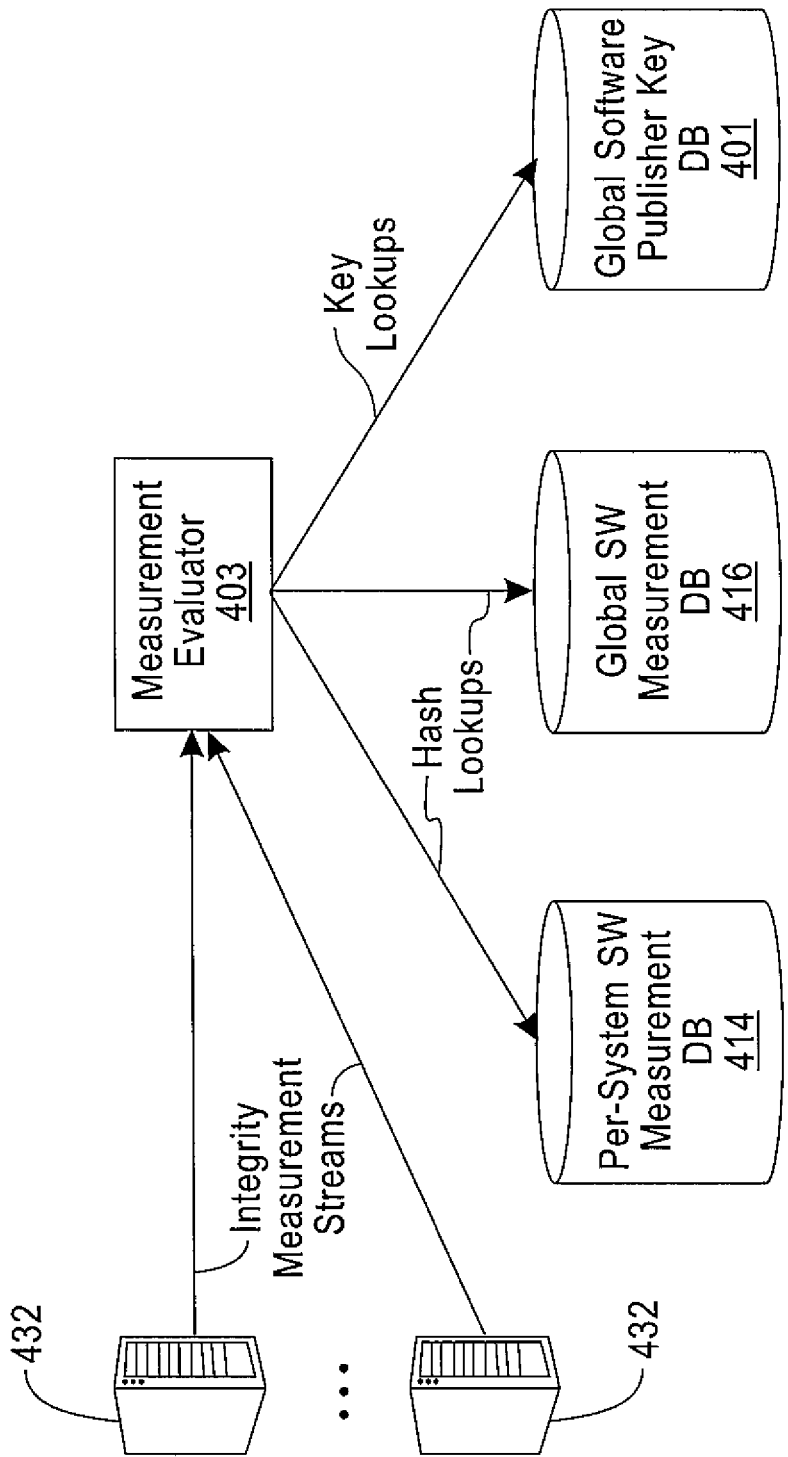
FIG. 4 illustrates integrity verification in accordance with the present invention.

For each of the monitored systems, a small local whitelist will be constructed in the learning phase. The local whitelist may contain information about applications deemed to not have security violations and therefore may be executed without raising an alarm. Integrity of files will be determined by comparing received measurements against the local and global white lists, as illustrated in FIG. 4. The Measurement Evaluator 403 obtains streams containing auditing data, file integrity measurement, and identifiers of publisher keys (pk) used for signing executables executed on servers 432. It evaluates the integrity of the software measurements found in those streams by using hash lookups for software measurements (hashes) stored in the Per-System Software Measurement DB 414 (e.g., see databases 214 and 314) and the Global Software Measurement DB 416 (e.g., see databases 216 and 316). It performs lookups into the Global Software Publisher Key (PK) DB 401 based on the above mentioned key identifiers.

The integrity measurement streams from the servers may include information corresponding to the publisher key (PK) database 401 (e.g., the PK DB 160 from FIG. 1) and the databases 414, 416. For instance, a server that has been instrumented to run the Integrity Measurement Architecture measures a program before it is started and appends the measurement to a log. These measurements then serve as inputs 240 from FIG. 2. Further, IMA can be used to verify the signatures on executables and in this case IMA augments the file measurement data 240 with the key identifier of the publisher key used to verify the signature of the executable. Instead of sending large amounts of data regarding the inputs 240, in an exemplary embodiment, hashes are used for the integrity measurement streams. Each hash may correspond to a file measurement stored in the per-system SW measurement database and/or the global SW measurement database 416. The integrity measurement streams may also include keys or their identifiers corresponding to the applications in the global software publisher key DB 401.

An alert might be triggered by the measurement evaluator 403 if the key received in the integrity measurement streams for a particular application is not the same as the key in the global software publisher key database 410 for this particular application. Also, if the key received in the integrity measurement streams does not exist in the global software publisher key database 401, the measurement evaluator 403 may trigger an alert. Furthermore, if an application is unsigned but is indicated in the integrity measurement streams, the measurement evaluator 403 could trigger an alert. The measurement evaluator 403 may also trigger an alert if there is a non-existent hash (that is, a hash received from the integrity measurement streams does not exist in the databases 414, 416). In an example, a hash that is not in the per-system software measurement database 414 may be added to the database 414 (e.g., after an alert has been issued).

Exemplary embodiments may leverage useful external security-related information to achieve a better detection rate. For instance, an external IP/Domain blacklist may be used to assess network connections; an external file blacklist may be used to access file creation/modification activities; and software vulnerability reports may be used to evaluate the programs running on monitored systems.

Exemplary embodiments may leverage the cloud to simplify the derivation of patterns and clusters of expected behavior. For example, VMs launched by the same user, running the same programs, started from the same image or family of images, etc., could share learned patterns/models with each other. Collection and analysis of patterns and clusters of behaviors allow the building of profiles and detection of deviations to be amortized over multiple systems.

Exemplary embodiments may also preferably monitor the network activity of processes running on a physical computer system or virtual machine by tapping into network traffic such as DNS (Domain Name System), DHCP (Dynamic Host Configuration Protocol), ARP (Address Resolution Protocol) and NetFlow (a feature that provides the ability to collect IP network traffic as this traffic enters or exits an interface) and correlate network behavior between systems.

Provenance information about security-sensitive activities may be kept by exemplary embodiments for later investigation, by either human or automated analysis.

The highly scalable distributed stream processing engine and a distributed NoSQL (SQL stands for Structured Query Language) database may be used to facilitate all the information processing and storage in the invention. Previous behavior-based protection engines perform analysis locally on monitored systems, which introduces performance overhead and increases the attack surface for attackers. With the inventive highly scalable dedicated detection system, the load introduced by known solutions on each monitored system can be moved away from those systems onto dedicated servers where a stream processing engine is running.

An implementation of the invention monitors the creation, modification and deletion of files by software that may be part of an installation of new software, where also API (Application Programming Interface) calls to a system's registry by an installer may be invoked. Using information from system events, i.e., auditing events, the analytics engine can conclude what process created/modified/deleted files and called an API and can raise an alarm if no similar event has ever been monitored before for a process started from the same program on any other system. The system can extract file modification patterns from monitored information. In learning mode, the software system may observe each program's file modification activities during its execution. For instance, the file name, uid (user identification) and file creation flags passed into the 'open' system call. This information is recorded as part of the program's file modification pattern. Additionally, for file names generated dynamically during the execution of the program (e.g., temporary files), the software system may try to extract rules from the observed file names and also save these as part of the program's file modification pattern. The software system allows the learned file modification profiles to be shared between multiple similar systems so that the learning will only need to be done on one of them. For instance, in a cloud computing environment, systems initiated from the same image could be marked as similar systems and share profiles between each other.

Further, the analytics engine monitors the network activity of processes running on a computer system including tapping into network traffic such as DNS, DHCP, ARP and other IP traffic and correlates network behavior between systems. A reputation score may be introduced for each monitored computer system. The reputation score would be calculated through an accumulation of the history of violations detected for a particular system (networking, file system activity, API calls).

In enforcement mode, the software system observes file modification activities of each program during its execution and then compares each of the observed activities with the baseline patterns/models extracted in the learning phase. If the system cannot find any similar pattern in this program's profile, the activity will be marked as a violation and an alert will be raised to notify a system security administrator.

An implementation of the invention could be as follows using the LINUX operating system, which is merely exemplary. The LINUX auditing system would be set up to enable monitoring of system calls issued in a running system. In particular the following actions could be monitored:

processes' provenance from the start of the system (For example, this can be accomplished by monitoring the execve system call in a LINUX system. Further, with knowledge about the pid, process identifier, and the ppid, parent process identifier, of each monitored execve system call, the relationship between processes can be maintained);

file provenance from the start of the system (For example, monitoring the creation of files can be accomplished by monitoring the open system call that has the O_CREATE flag set in a LINUX system. Monitoring deletion of files can be accomplished by monitoring the unlink system call in a LINUX system. Modification of files can be monitored by monitoring the open system call with O_RDWR or O_WRONLY in a LINUX system);

network activity provenance from the start of the system (For example, this can be accomplished by monitoring the connect system call in a LINUX system. Monitoring network binding attempts can be performed by monitoring any bind system call in a LINUX system. Monitoring network activates (DNS, DHCP, ARP, IP traffic, NetFlow) of said computer systems can be done by tapping underlying network infrastructure);

monitoring the insertion of kernel modules by processes and any descendant processes can be accomplished by monitoring the insmod syscall in a LINUX system; and monitoring software registry key(s) provenance from the start of a system.

Tracing all these actions allows an observer to determine what files were created and modified in the running system.

Figure 5:
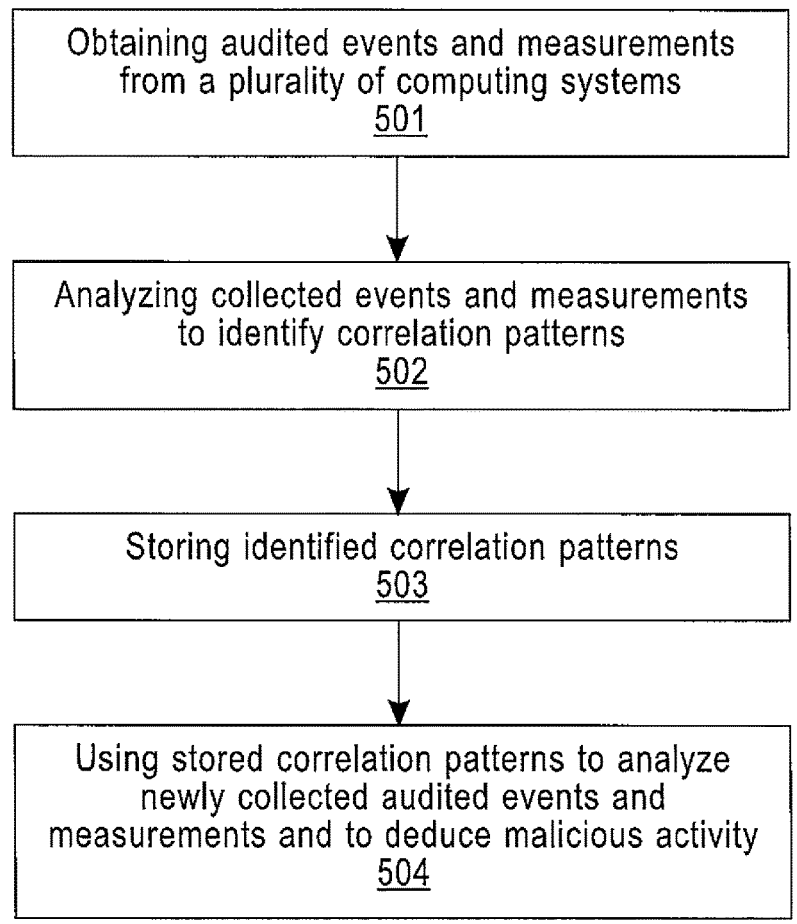
FIG. 5 illustrates an example embodiment of a process flow for an exemplary embodiment.

FIG. 5 provides a sample process flow for a method in accordance with an exemplary embodiment of the present invention. FIG. 5 illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 5 may be considered to be interconnected means for performing functions in the blocks.

At block 501, the system collects audited events and measurements from a plurality of computing systems. At block 502, the Analytics Engine analyzes collected events and file integrity measurements to identify correlation patterns. In a learning phase, at block 503, the system stores identified correlation patterns. In an enforcement phase, at block 504, the system uses stored correlation patterns to analyze newly collected audit events and file integrity measurements and deduces malicious activity.

In an exemplary embodiment, the analyzing in block 502 may be performed by analyzing collected data and correlating sequences of systems calls of applications among different running computer systems to deduce malicious activities. In another exemplary embodiment, the collecting may further comprise collecting data comprising at least monitoring creation of processes in said computer systems. Furthermore, said collecting may comprise following processes' child processes and all their descendants.

In a further exemplary embodiment, any of the methods of the above may be further refined by refining the collecting in block 501. For instance, the collecting may comprise monitoring creation of files by said processes and any of their descendant processes. Additionally, said collecting in block 501 may comprise monitoring deletion of files by said processes and any of their descendant processes. Furthermore, said collecting in block 501 may comprise monitoring modification of files by said processes and any of their descendant processes. In another exemplary embodiment, said collecting in block 501 may comprise monitoring the invocation of certain API calls (related to software registry for example) and passed parameters by said processes and any of their descendant processes.

In a further exemplary embodiment, any of the methods above may be modified where said analyzing in block 502 may comprise extracting file modification patterns from monitored information. The analyzing may also comprise comparing new file modification event(s) with said extracted file modification patterns. It is also possible to share learned file modification patterns between multiple systems. Alternatively or in addition, the analyzing may comprise correlating new file modification event(s) from multiple systems. The method may also further comprise verifying the integrity of said running computer system by evaluating file modifications following previously established patterns.

In a further exemplary embodiment, any of the methods of the above may additionally be revised such that collecting in block 501 comprises monitoring network connection attempts made by said processes and any of their descendant processes. The collecting may additionally comprise monitoring network binding attempts made by said processes and any of their descendant processes. The collecting may also comprise monitoring network activates (DNS, DHCP, ARP, IP traffic) of said computer systems by tapping underlying network infrastructure and receiving network statistics through Netflow or similar mechanisms. Alternatively, or in addition to the operations in this paragraph, the analyzing may comprise correlating observed network activities, connection attempts and binding attempts from multiple systems.

Any of the methods above may be further refined by the collecting in block 501 comprising monitoring insertion of kernel modules by said processes and any descendant processes. Alternatively or in addition, the analyzing may comprise correlating observed kernel module insertion with previously observed behavior (e.g., verification results).

In another exemplary embodiment, any of the methods above may include where the analyzing in block 502 further comprises calculating a reputation score of running computer systems by evaluating their violation history. The evaluation may further comprise evaluating the trustworthiness of input data based on said calculated reputation score.

Any of the methods of the above may further comprise building learned models on observed activities by utilizing a learning algorithm. The collecting in block 501 may additionally comprise calculating a score by evaluating how an event deviates from learned models. Additionally, the method may further comprise at least one of taking automatic remedial action based on said calculated score and/or recommending remedial actions.

Any of the methods of the above may comprise where said analyzing in block 502 comprises leveraging at least one of signatures of files from file blacklists, information from IP/Domain blacklists, and information from a public vulnerability database.

Any of the methods of the above may additionally include where said analyzing in block 502 comprises leveraging distributed stream processing systems and scalable high performance NoSQL database to process and store all the collected information.

In a further exemplary embodiment, an apparatus comprises means for performing any of the methods of FIG. 5 and its associated methods described above. Additionally, another exemplary embodiment is an apparatus comprising one or more processors and one or more memories comprising computer readable code. The one or more processors, in response to execution of the computer program code cause the apparatus to perform any of the methods of FIG. 5 and its associated methods described above.

An additional exemplary embodiment includes a computer program, comprising code for performing any of the methods of FIG. 5 and its associated methods described above, when the computer program is run on a processor. Another exemplary embodiment is a computer program according to this paragraph, wherein the computer program is a computer program product comprising a computer-readable medium bearing computer program code embodied therein for use with a computer.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Exemplary characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
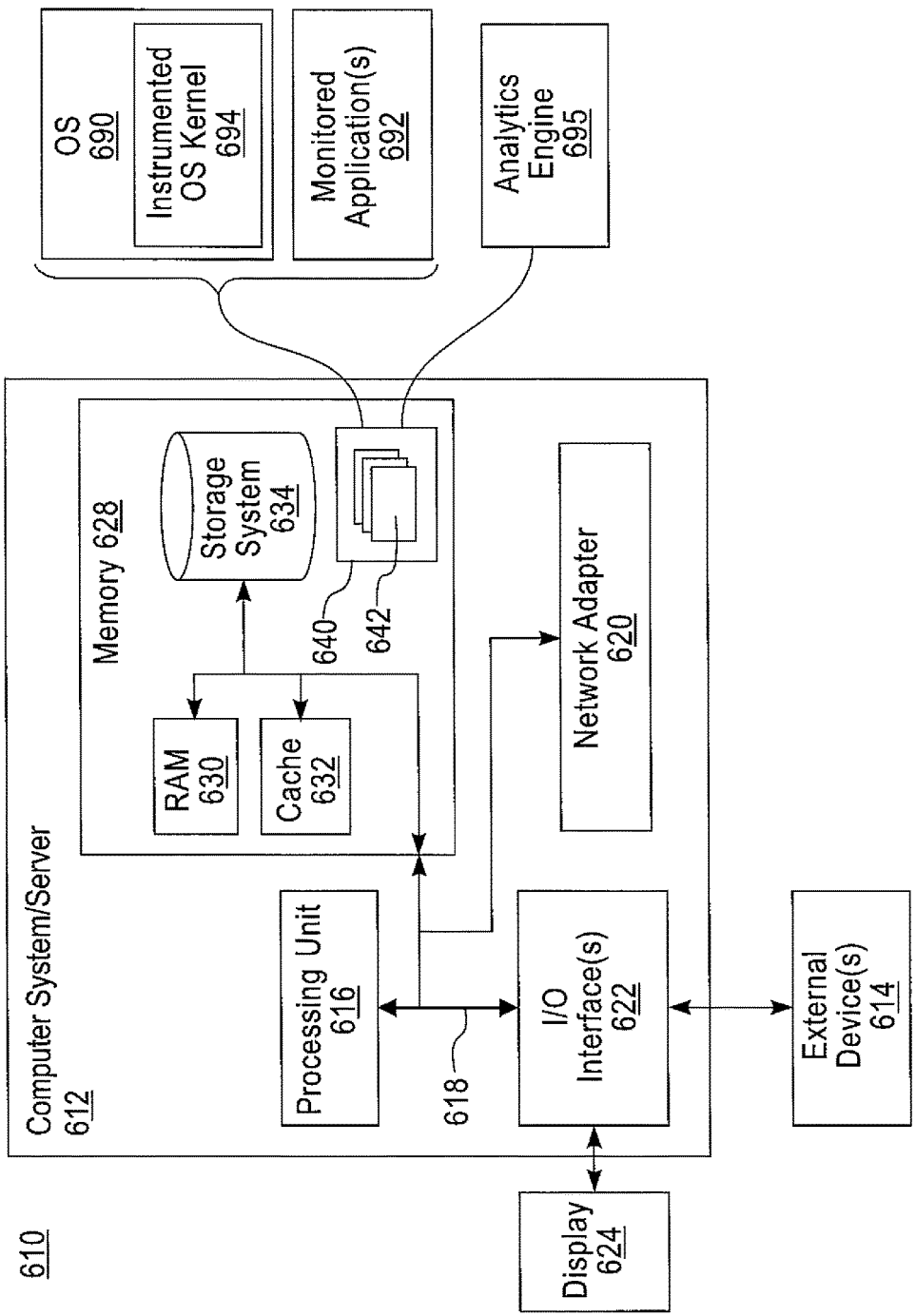
FIG. 6 depicts a cloud computing node according to an exemplary embodiment.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

In one example, the computer system/server 612 is a computer system such as a virtual machine 119 or a server 132/432. The computer system/server 112 comprise an operating system (OS) 690 that has an instrumented OS kernel 694, which has been instrumented to report system calls and call parameters invoked by monitored application(s) 692. The system calls are calls to elements in the computer system/server 612, such as the BIOS or other firmware and/or to the OS 690. In FIG. 1, in an exemplary embodiment, each of the virtual machines 119 or servers 132/432 being monitored would have a similar instrumented OS kernel. Note that there is no requirement that the OSes have to be the same for the virtual machines 119 and servers 132/432, as each such machine could have different operating systems.

In another example, the computer system/server 612 implements the analytics engine 695, which is a version of the analytics engines described above and may include the measurement evaluators, auditing events collectors, measurement collectors, and template parsers as described above.

The computer system/server 612 can perform, for instance, the method of FIG. 5 and other embodiments as described above.

Figure 7:
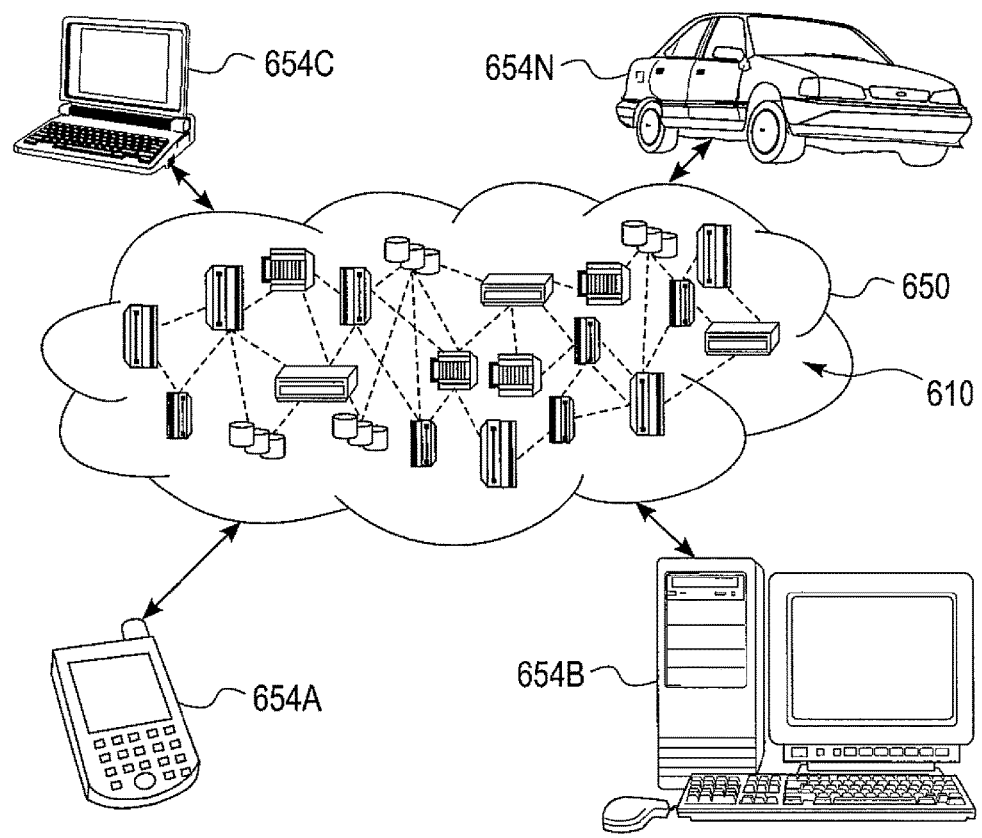
FIG. 7 depicts a cloud computing environment according to an exemplary embodiment.

Referring now to FIG. 7, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 664A-N shown in FIG. 7 are intended to be illustrative only and that computing nodes 610 and cloud computing environment 650 can communicate with any type of computerized device over any type of network and/or network addressable connection (e.g., using a web browser).

Figure 8:
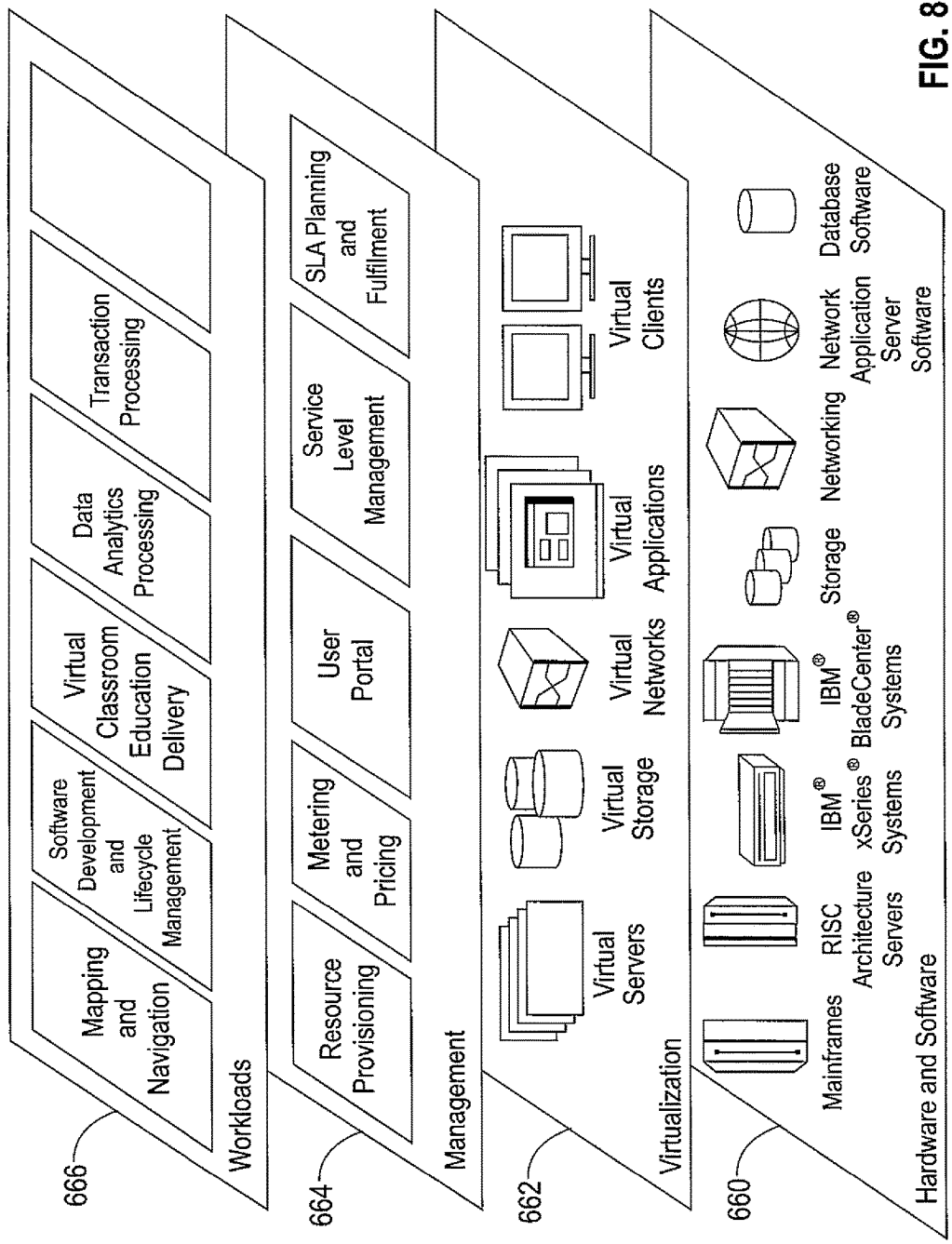
FIG. 8 depicts abstraction model layers according to an exemplary embodiment.

Referring now to FIG. 8, a set of functional abstraction layers provided by cloud computing environment 650 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of; cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery, data analytics processing; transaction processing; and the like.

Turning to FIG. 9, this figure is a logic flow diagram for detecting, investigating and remediating security violations to IT infrastructure. This figure illustrates the operation of an exemplary method, a result of execution of computer program instructions embodied on a computer readable memory, functions performed by logic implemented in hardware, and/or interconnected means for performing functions in accordance with exemplary embodiments. The blocks in the method 900 of FIG. 9 may be performed by a cloud computing node 610 that implements an analytics engine 695. FIG. 9 may be considered to be a more specific version of the method of FIG. 5. It is noted that the blocks from FIG. 5 and the embodiments described in relation to FIG. 5 are also applicable to FIG. 9 and may be combined freely with the blocks in FIG. 9 and the embodiments described in relation to FIG. 9.

In block 910, the cloud computing node 610 performs the operation of collecting system calls and call parameters invoked by monitored applications for each of a plurality of target computer systems. The system calls and call parameters are received from operating system kernels on the plurality of target computer systems, where the operating system kernels have been instrumented to report system calls and call parameters invoked by the monitored applications. For instance, each of the VMs 119 or servers 132 (see FIG. 1) may have an instrumented OS kernel 694 as illustrated in FIG. 6. The instrumented OS kernel 694 can report system calls and call parameters invoked by monitored applications 692.

In block 920, the cloud computing node 610 performs the operation of correlating sequences of systems calls and call parameters of the monitored applications among different target computer systems to deduce malicious activities. In block 930, the cloud computing node 610 performs the operation of performing one or more remedial actions in response to one or more malicious activities being deduced by the correlating.

In another example of method 900, at least one of the plurality of computer systems comprises a user level monitoring application performing at least one of processing system calls locally or forwarding system calls to another set of local (e.g., on one computer system) or remote (e.g., off the computer system and on a different computer system) monitoring applications.

In another exemplary embodiment of method 900, the operating system kernels are run on the plurality of target computer systems. The target computer systems further implement an auditing subsystem. The operating system kernels use the auditing subsystem to monitor which executables, scripts, or libraries were run by users of a corresponding target computer system. The operating system kernels report information about said executables, scripts, or libraries to the computer system for collecting and processing. It is noted that the monitored applications correspond to the executables, scripts, and/or libraries, although not all applications will correspond to all of these. For instance, an application may not contain scripts.

Another example is any of the methods above, further comprising recording reported system call invocations in a database, wherein the correlating comprises correlating received reported system call invocations with recorded reported system call invocations from the database to deduce malicious activities.

Another example is any of the methods above, where executables, scripts, or libraries are acquired by crawling public software package repositories. The method also includes the following: receiving a list of repositories to crawl; logging into the repositories and walking a list of directories recursively; comparing names of packages found in said directories against known packages in a database; downloading those packages that are not known; installing the files of those software packages on a system; calculating the checksums on said files; and recording at least the checksums and file metadata of said files into a database. Additionally, the checksum may be a hash.

Another example is any of the methods above, wherein collecting comprises receiving one or more values for hashes from one or more of the target computer systems. Correlating further comprises: comparing the received one or more values of the hashes with values of hashes in one or more databases; and deducing a malicious activity has occurred in response to the received one or more values of the hashes not corresponding to values of hashes in the one or more databases. Performing one or more remedial actions further comprises outputting an alert indicating the received one or more values of the hashes do not corresponding to values of hashes in the one or more databases.

Another example is any of the methods above, wherein collecting comprises receiving a value for a key from one or more of the target computer systems. The value of the key corresponds to a particular monitored application. Correlating further comprises: comparing the received value for the key with values of keys in one or more databases; and deducing a malicious activity has occurred in response to the received value of the key not corresponding to values of keys in the one or more databases or the received value of the key not matching with a key in the one or more databases for the particular application. Performing one or more remedial actions further comprises outputting an alert indicating the received key does not correspond to a key for the particular application in the one or more databases.

Another example is any of the methods above, wherein at least one of the target computer systems comprises a virtual machine and wherein performing one or more remedial actions further comprises one of placing the virtual machine in a quarantine network or pausing the virtual machine.

Another example is any of the methods above, wherein at least one of the target computer systems comprises a particular computer system and wherein performing one or more remedial actions further comprises isolating the particular computer system at least by causing blocking network traffic to and from the particular computer system. For instance, a command could be sent to a network switch to block the traffic to and from the particular computer system.

In a further exemplary embodiment, an apparatus comprises means for performing any of the methods of FIG. 9 and its associated methods described above. Additionally, another exemplary embodiment is an apparatus comprising one or more processors and one or more memories comprising computer readable code. The one or more processors, in response to execution of the computer program code cause the apparatus to perform any of the methods of FIG. 9 and its associated methods described above.

An additional exemplary embodiment includes a computer program, comprising code for performing any of the methods of FIG. 9 and its associated methods described above, when the computer program is run on a processor. Another exemplary embodiment is a computer program according to this paragraph, wherein the computer program is a computer program product comprising a computer-readable medium bearing computer program code embodied therein for use with a computer.

Turning to FIG. 10, this figure is another logic flow diagram for detecting, investigating and remediating security violations to IT infrastructure. FIG. 10 corresponds to computer system 170. FIG. 10 illustrates the operation of an exemplary method 1000, a result of execution of computer program instructions embodied on a computer readable memory, functions performed by logic implemented in hardware, and/or interconnected means for performing functions in accordance with exemplary embodiments. FIG. 10 may be considered to be performed in part by a computer system 170, e.g., implemented as a cloud computing node 610. However, some examples have some parts of the flow performed by an administrator, as described below.

In block 1010, it is determined that network activity at a specific time is deemed to be suspicious. In block 1020, it is determined, using Internet protocol addresses involved in the suspicious network activity, one or more computer systems that are sources of the suspicious network activity. In block 1030, it is determined, based on the specific time and the determined one or more computer systems, one or more applications executing on the determined one or more computer systems that are causing the suspicious network activity. In block 1040, one or more remedial actions are caused to be performed for the determined one or more computer systems.

In an example, for method 1000, causing the one or more remedial actions to be performed further comprises causing the determined one or more computer systems to be quarantined, paused or shut down.

In another example for method 1000, at least one of the determined one or more computer systems comprises a virtual machine. Causing the one or more remedial actions to be performed further comprises one of causing the virtual machine to be placed in a quarantine network or causing the virtual machine to be paused or causing the virtual machine to be shut down. In an additional example for the methods as above, at least one of the determined one or more computer systems comprises a particular computer system. Performing one or more remedial actions further comprises causing the particular computer system to be isolated at least by causing blocking of network traffic to and from the particular computer system. Note that a system might comprise both VMs 119 and servers 132, and both types of machines can have remedial operations placed on them, e.g., at the same time if necessary.

A further example is a method as above, where determining that network activity at a specific time is deemed to be suspicious is based on network activity as observed on switches.

A method as above may be further defined by the method further comprising displaying on a display of a particular computer system network activity as observed on switches for a plurality of computer systems. The particular computer system is, e.g., computer system 170 of FIG. 1 and display 624 (see FIG. 6) includes the Net/Dev Analytics GUI 175 in this example. The determining that network activity at a specific time is deemed to be suspicious is performed by an administrator or automatically by the system based at least on the determined network activity. The method further comprises displaying on the display 624 of the particular computer system 170 Internet protocol addresses involved in the suspicious network activity. The determining one or more computer systems that are sources of the specific network activity is performed by the administrator based on the displayed Internet protocol addresses involved in the suspicious network activity. The method further comprises displaying on the display 624 of the particular computer system 170 a plurality of applications executing on the one or more computer systems. The determining the one or more applications executing on the one or more computer systems that are causing the network activity is performed by an administrator using the displayed plurality of applications executing on the one or more computer systems. The causing one or more remedial actions to be performed for the one or more computer systems is performed by the particular computer system 170, responsive to input from the administrator. That is, the administrator may request that a network switch 190 prevent traffic from being directed to or coming out of a VM 119 or a server 132, and the computer system 170, in response to the request, would be programmed to cause the network switch 190 to prevent the traffic.

In another exemplary embodiment, the computer system 170 may take actions that are fully automated, e.g., by the Net/Dev Analytics Engine 180. For instance, the specific computer system 170 performs the determining that network activity at a specific time is deemed to be suspicious, the determining one or more computer systems that are sources of the specific network activity, the determining the one or more applications executing on the one or more computer systems that are causing the network activity, and the causing one or more remedial actions to be performed for the one or more computer systems.

In a further exemplary embodiment, an apparatus comprises means for performing any of the methods of FIG. 10 and its associated methods described above. Additionally, another exemplary embodiment is an apparatus comprising one or more processors and one or more memories comprising computer readable code. The one or more processors, in response to execution of the computer program code cause the apparatus to perform any of the methods of FIG. 10 and its associated methods described above.

An additional exemplary embodiment includes a computer program, comprising code for performing any of the methods of FIG. 10 and its associated methods described above, when the computer program is run on a processor. Another exemplary embodiment is a computer program according to this paragraph, wherein the computer program is a computer program product comprising a computer-readable medium bearing computer program code embodied therein for use with a computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining that network activity in an infrastructure at a specific time is deemed to be suspicious based at least on network activity as observed on switches in the infrastructure;
    determining, using Internet protocol addresses involved in the suspicious network activity observed on one or more of the switches, one or more computer systems in the infrastructure that are sources of the suspicious network activity,
    determining, based on the specific time and the determined one or more computer systems, one or more applications executing on the one or more determined computer systems in the infrastructure that are causing the suspicious network activity to be observed at least by determining which applications from the one or more determined computer systems were causing the network traffic at the specific time, and determining which applications were causing network traffic at the specific time is based on collected system calls and call parameters for system calls that were performed by the one or more determined computer systems and is based on corresponding timestamps indicating when the system calls were invoked, where operating system kernels on the one or more determined computer systems have been instrumented via code instructions in the operating system kernels to report at least the system calls and call parameters invoked by monitored applications;
    determining whether any collected events and measurements corresponding to the one or more applications are considered significant for analysis;
    analyzing any collected events and measurements determined to be significant for analysis to determine whether a security violation has occurred for any of the one or more applications; and
    causing, in response to a security violation being deemed to have occurred for at least one of the one or more applications, one or more remedial actions to be performed for the determined one or more computer systems that correspond to the at least one application.

2. The method of claim 1, wherein at least one of the determined one or more computer systems comprises a virtual machine and wherein causing the one or more remedial actions to be performed further comprises causing the virtual machine to be placed in a quarantine network.

3. The method of claim 1, wherein at least one of the determined one or more computer systems comprises a virtual machine and wherein causing the one or more remedial actions to be performed further comprises causing the virtual machine to be paused.

4. The method of claim 1, wherein at least one of the determined one or more computer systems comprises a virtual machine and wherein causing the one or more remedial actions to be performed further comprises causing the virtual machine to be shutdown.

5. The method of claim 1, wherein at least one of the determined one or more computer systems comprises a particular computer system and wherein performing one or more remedial actions further comprises causing the particular computer system to be isolated at least by causing blocking of network traffic to and from the particular computer system.

6. The method of claim 1, wherein:
    the method further comprises displaying on a display of a particular computer system network activity as observed on switches for a plurality of computer systems;
    the determining that network activity at a specific time is deemed to be suspicious based at least on network activity as observed on switches is performed by an administrator based at least on the displayed network activity observed on the one or more switches;
    the method further comprises displaying on the display of the particular computer system Internet protocol addresses determined to be involved in the suspicious network activity observed on the one or more switches;
    the determining one or more computer systems that are sources of the suspicious network activity is performed by the administrator or automatically by an analytics application based on the determined Internet protocol addresses involved in the suspicious network activity,
    the method further comprises displaying on the display of the particular computer system a plurality of applications executing on the one or more determined computer systems, the displaying using the collected system calls for the one or more determined computer systems;
    the determining one or more applications executing on the one or more computer systems that are causing the network activity is performed by an administrator using the displayed plurality of applications executing on the one or more computer systems; and
    causing one or more remedial actions to be performed for the one or more computer systems is performed by the particular computer system, responsive to input from the administrator.

7. The method of claim 1, wherein a specific computer system performs the determining that network activity at a specific time is deemed to be suspicious, the determining one or more computer systems that are sources of the suspicious network activity, the determining the one or more applications executing on the one or more computer systems that are causing the network activity, and the causing one or more remedial actions to be performed for the one or more computer systems.

8. The method of claim 1, wherein using security information external to the infrastructure to determine significance of the collected events and measurements further comprises one or more of the following:

comparing Internet protocol/domain blacklists against network connections created by determined one or more computer systems having the one or more applications;

comparing external file blacklists to assess file creation activities or file modification activities or both file creation and file modification activities by the one or more applications; and using software vulnerability reports to evaluate the one or more applications.

9. The method of claim 1, wherein using security information external to the infrastructure to determine significance of the collected events and measurements further comprises using a whitelist comprising indications of applications that have been deemed to have no security violations to evaluate the one or more applications.

10. An apparatus, comprising:

one or more processors; and one or more memories comprising computer readable code, wherein the one or more processors, in response to execution of the computer program code, cause the apparatus to perform at least the following:

determining that network activity in an infrastructure at a specific time is deemed to be suspicious based at least on network activity as observed on switches in the infrastructure;

determining, using Internet protocol addresses involved in the suspicious network activity observed on one or more of the switches, one or more computer systems in the infrastructure that are sources of the suspicious network activity;

determining, based on the specific time and the determined one or more computer systems, one or more applications executing on the one or more determined computer systems in the infrastructure that are causing the suspicious network activity to be observed at least by determining which applications from the one or more determined computer systems were causing network traffic at the specific time, and determining which applications were causing network traffic at the specific time is based on collected system calls and call parameters for system calls that were performed by the one or more determined computer systems and is based on corresponding timestamps indicating when the system calls were invoked, where operating system kernels on the one or more determined computer systems have been instrumented via code instructions in the operating system kernels to report at least the system calls and call parameters invoked by monitored applications;

determining whether any collected events and measurements corresponding to the one or more applications are considered significant for analysis;

analyzing any collected events and measurements determined to be significant for analysis to determine whether a security violation has occurred for any of the one or more applications; and causing, in response to a security violation being deemed to have occurred for at least one of the one or more applications, one or more remedial actions to be performed for the determined one or more computer systems that correspond to the at least one application.

11. The apparatus of claim 10, wherein at least one of the determined one or more computer systems comprises a virtual machine and wherein causing the one or more remedial actions to be performed further comprises causing the virtual machine to be placed in a quarantine network.

12. The apparatus of claim 10, wherein at least one of the determined one or more computer systems comprises a virtual machine and wherein causing the one or more remedial actions to be performed further comprises causing the virtual machine to be paused.

13. The apparatus of claim 10, wherein at least one of the determined one or more computer systems comprises a virtual machine and wherein causing the one or more remedial actions to be performed further comprises causing the virtual machine to be shutdown.

14. The apparatus of claim 10, wherein at least one of the determined one or more computer systems comprises a particular computer system and wherein performing one or more remedial actions further comprises causing the particular computer system to be isolated at least by causing blocking of network traffic to and from the particular computer system.

15. The apparatus of claim 10, wherein:

wherein the one or more processors, in response to execution of the computer program code, further cause the apparatus to perform displaying on a display of a particular computer system network activity as observed on switches for a plurality of computer systems to select the one or more switches;

the determining that network activity at a specific time is deemed to be suspicious based at least on network activity as observed on switches is performed by an administrator based at least on the displayed network activity observed on the one or more switches;

wherein the one or more processors, in response to execution of the computer program code, further cause the apparatus to perform displaying on the display of the particular computer system Internet protocol addresses determined to be involved in the suspicious network activity observed on the one or more switches;

the determining one or more computer systems that are sources of the suspicious network activity is performed by the administrator or automatically by an analytics application based on the determined Internet protocol addresses involved in the suspicious network activity, wherein the one or more processors, in response to execution of the computer program code, further cause the apparatus to perform displaying on the display of the particular computer system a plurality of applications executing on the one or more determined computer systems, the displaying using the collected system calls for the one or more determined computer systems;

the determining one or more applications executing on the one or more computer systems that are causing the network activity is performed by an administrator using the displayed plurality of applications executing on the one or more computer systems; and causing one or more remedial actions to be performed for the one or more computer systems is performed by the particular computer system, responsive to input from the administrator.

16. The apparatus of claim 10, wherein a specific computer system performs the determining that network activity at a specific time is deemed to be suspicious, the determining one or more computer systems that are sources of the suspicious network activity, the determining the one or more applications executing on the one or more computer systems that are causing the network activity, and the causing one or more remedial actions to be performed for the one or more computer systems.

17. A computer program product, comprising a computer readable storage medium having program instructions embodied therewith, the program instructions executable by an apparatus comprising one or more processors to cause the apparatus to perform at least the following:
  determining that network activity in an infrastructure at a specific time is deemed to be suspicious based at least on network activity as observed on switches in the infrastructure;
  determining, using Internet protocol addresses involved in the suspicious network activity observed on one or more of the switches, one or more computer systems in the infrastructure that are sources of the suspicious network activity;
  determining, based on the specific time and the determined one or more computer systems, one or more applications executing on the one or more determined computer systems in the infrastructure that are causing the suspicious network activity to be observed at least by determining which applications from the one or more determined computer systems were causing network traffic at the specific time, and determining which applications were causing network traffic at the specific time is based on collected system calls and call parameters for system calls that were performed by the one or more determined computer systems and is based on corresponding timestamps indicating when the system calls were invoked, where operating system kernels on the one or more determined computer systems have been instrumented via code instructions in the operating system kernels to report at least the system calls and call parameters invoked by monitored applications;
  determining whether any collected events and measurements corresponding to the one or more applications are considered significant for analysis;
  analyzing any collected events and measurements determined to be significant for analysis to determine whether a security violation has occurred for any of the one or more applications; and
  causing, in response to a security violation being deemed to have occurred for at least one of the one or more applications, one or more remedial actions to be performed for the determined one or more computer systems that correspond to the at least one application.

18. The computer program product of claim 17, wherein at least one of the determined one or more computer systems comprises a virtual machine and wherein causing the one or more remedial actions to be performed further comprises one of causing the virtual machine to be placed in a quarantine network, causing the virtual machine to be paused, or causing the virtual machine to be shutdown.

19. The computer program product of claim 17, wherein at least one of the determined one or more computer systems comprises a particular computer system and wherein performing one or more remedial actions further comprises causing the particular computer system to be isolated at least by causing blocking of network traffic to and from the particular computer system.

20. The computer program product of claim 17,
  the program instructions executable by the apparatus further cause the apparatus to perform displaying on a display of a particular computer system network activity as observed on switches for a plurality of computer systems;
  the determining that network activity at a specific time is deemed to be suspicious based at least on network activity as observed on switches is performed by an administrator based at least on the displayed network activity observed on the one or more switches;
  the program instructions executable by the apparatus further cause the apparatus to perform displaying on the display of the particular computer system Internet protocol addresses determined to be involved in the suspicious network activity observed on the one or more switches;
  the determining one or more computer systems that are sources of the suspicious network activity is performed by the administrator or automatically by an analytics application based on the determined Internet protocol addresses involved in the suspicious network activity;
  the program instructions executable by the apparatus further cause the apparatus to perform displaying on the display of the particular computer system a plurality of applications executing on the one or more determined computer systems, the displaying using the collected system calls for the one or more determined computer systems;
  the determining one or more applications executing on the one or more computer systems that are causing the network activity is performed by an administrator using the displayed plurality of applications executing on the one or more computer systems; and
  causing one or more remedial actions to be performed for the one or more computer systems is performed by the particular computer system, responsive to input from the administrator.

* * * * *